United States Patent [19]

Murray

[11] Patent Number: 4,625,130
[45] Date of Patent: Nov. 25, 1986

[54] MASK SIGNAL GENERATOR

[75] Inventor: Lance R. Murray, San Diego, Calif.

[73] Assignee: Burroughs Corporation, Detroit, Mich.

[21] Appl. No.: 615,266

[22] Filed: May 30, 1984

[51] Int. Cl.$^4$ .......................................... H03K 19/177
[52] U.S. Cl. .................... 307/468; 307/448; 307/449; 307/472; 340/825.91
[58] Field of Search ............................... 307/448–449, 307/463, 468, 469, 472; 340/825.86, 825.87, 825.91; 364/900 MS File

[56] References Cited

U.S. PATENT DOCUMENTS

| | | | |
|---|---|---|---|
| 4,031,379 | 6/1977 | Schwartz | 307/472 X |
| 4,348,737 | 9/1982 | Cukier et al. | 364/900 MS |
| 4,430,584 | 2/1984 | Someshwar et al. | 307/463 X |
| 4,491,839 | 1/1985 | Adam | 340/825.91 |
| 4,541,067 | 9/1985 | Whitaker | 307/472 X |

Primary Examiner—Stanley D. Miller
Assistant Examiner—D. R. Hudspeth
Attorney, Agent, or Firm—Charles J. Fassbender; Kevin R. Peterson

[57] ABSTRACT

A signal generator for generating mask signals includes a plurality of conductors 0 thru N respectively; each of the conductors is coupled through a respective resistive means to a first voltage bus; first, second, third, . . . groups of transistors of a first set respectively couple conductors 1 thru N, 2 thru N, 3 thru N, . . . N to a second voltage bus; first, second, third, . . . groups of transistors of a second set respectively couple conductors 0, 0 thru 1, 0 thru 2, . . . 0 thru N−1 to a second voltage bus; and decoders turn on the transistors of a selectable group of the first set and a selectable group of the second set in response to externally generated codes CD#1 and CD#2.

10 Claims, 9 Drawing Figures

FIG.2.

| | COL. 1 | COL. 2 | COL. 3 | COL. 4 | COL. 5 |
|---|---|---|---|---|---|
| CD #1 | 10 | 12 | 6 | 3 | 4 |
| CD #2 | 3 | 8 | 6 | 12 | 10 |
| SELECT | TRUE | TRUE | TRUE | FALSE | FALSE |
| MUX M1 | 10 | 12 | 6 | 11 | 9 |
| DECODER D1 | L10 | L12 | L6 | L11 | L9 |
| TRANSISTOR GROUP | G11 | G13 | G7 | G12 | G1 |
| MUX M2 | 3 | 8 | 6 | 4 | 5 |
| DECODER D2 | L3 | L8 | L6 | L4 | L5 |
| TRANSISTOR GROUP | G3' | G8' | G6' | G4' | G5' |
| CONDUCTORS AT +V1 | C10-C3 | C12-C8 | C6 | C11-C4 | C9-C5 |
| OUTPUT SIGNALS | S10-S3 | S12-S8 | S6 | S3-S0 &S15-S12 | S4-S0 &S15-S10 |

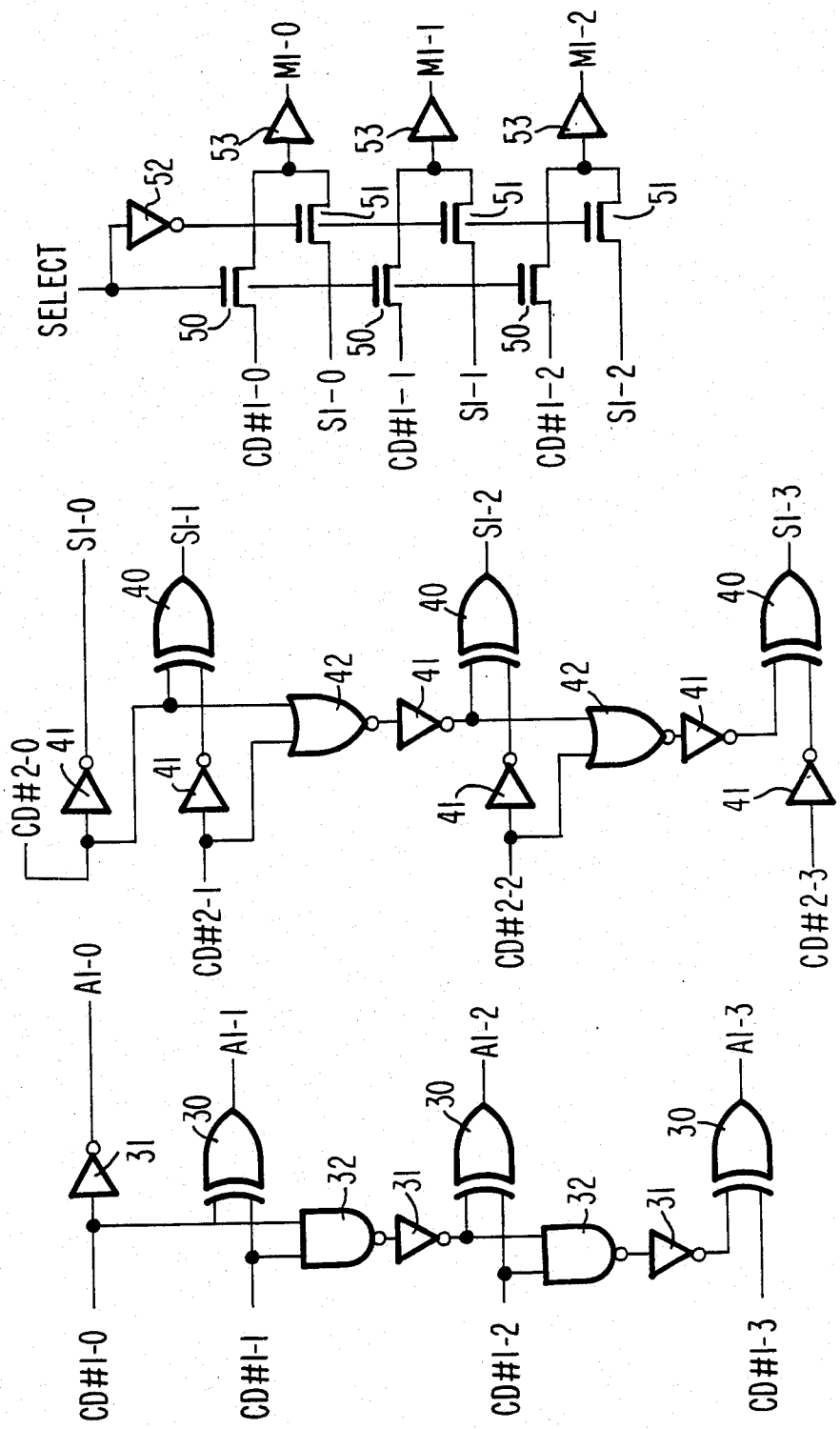

MASK SIGNAL GENERATOR

BACKGROUND OF THE INVENTION

This invention relates to digital signal generators; and more particularly, it relates to generators for producing masking control signals.

In a digital computer, digital data is formatted in words of predetermined lengths such as 16 bits, 32 bits, and 64 bits. Bit 0 is the least significant bit; bit 1 is the next least significant bit; bit 2 is the next least significant bit; etc. These data words are stored in various storage means such as a memory or a register from which they are selectively retrieved and operated on by an arithmetic unit in response to instructions of a program.

Often, however, the instructions specify that only a portion of a data word is to be operated on. For example, an instruction may specify to compare only bits 4 thru 12 of one 16-bit data word with bits 4 thru 12 of another 16-bit data word. In such a case, a means is needed to generate signals which mask those bits of the data word that are to be ignored in the arithmetic operation. In the above example, signals are needed to mask bits 0 thru 3 and 13 thru 15 from the selected data words prior to performing the compare operation.

One way to generate such masking signals is to use a read only memory. Two concatenated addresses (e.g., a code CD#1 and a code CD#2) are sent to the address input terminals of the read only memory. Code CD#1 specifies the most significant bit of the word that is not to be masked while CD#2 specifies the least significant bit of the word that is not to be masked. Each concatenation of code CD#1 and code CD#2 addresses a word in the read only memory, and bits in the addressed word are pre-set to the desired masking pattern.

A problem, however, with the above described read only memory signal generator is that it requires too many transistors for its implementation. For example, if the word that is to be masked contains 64 bits, then code CD#1 and code CD#2 both must contain six bits in order to be able to specify all of the 64-bit locations. Also, each word in the read only memory must contain 64 bits. Thus, the total number of transistors in the ROM (which equals the total number of bits in the ROM) is 64×64×64 which equals 262,144 transistors. Also, the number of transistors grows rapidly as the number of bits in the word that is to be masked increases.

Accordingly, a primary object of the invention is to provide an improved signal generator for producing mask signals which selectively mask bits of a data word.

Another object of the invention is to provide a mask signal generator which requires a substantially reduced number of transistors for its implementation.

BRIEF SUMMARY OF THE INVENTION

These objects and others are accomplished in accordance with the invention by a signal generator which includes a plurality of conductors 0 thru N respectively; each of the conductors is coupled through a respective resistive means to a first voltage bus; first, second, third, ... groups of transistors of a first set respectively couple conductors 1 thru N, 2 thru N, 3 thru N, ... N to a second voltage bus; first, second, third, ... groups of transistors of a second set respectively couple conductors 0, 0 thru 1, 0 thru 2, ... 0 thru N−1 to a second voltage bus; and decoders turn on the transistors of a selectable group of the first set and a selectable group of the second set in response to externally generated codes CD#1 and CD#1.

BRIEF DESCRIPTION OF THE DRAWINGS

Various features and advantages of the invention are described in the Detailed Description in conjunction with the accompanying drawings wherein:

FIG. 1A shows a detailed coupling of FIG. 1;

FIG. 2 shows a chart having entries that illustrate the operation of the FIG. 1 signal generator;

FIG. 4 is a detailed logic diagram of an adder A1 in the FIG. 1 signal generator;

FIG. 5 is a detailed logic diagram of a subtracter S1 in the FIG. 1 signal generator;

FIG. 6 is a detailed logic diagram of a portion of two multiplexers M1 and M2 in the FIG. 1 signal generator;

DETAILED DESCRIPTION OF THE INVENTION

Figure 1:
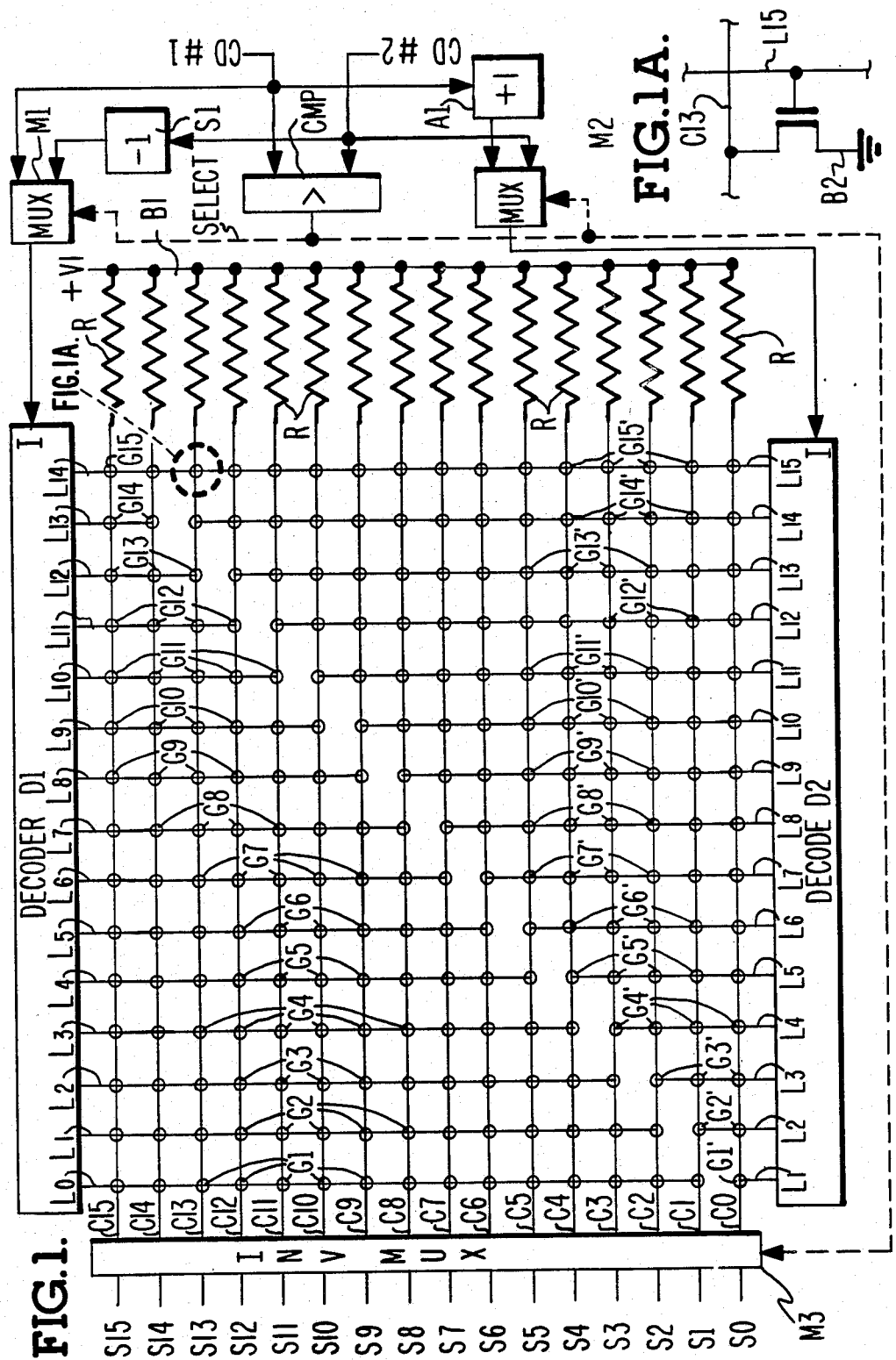
FIG. 1 shows one preferred embodiment of a signal generator that is constructed according to the invention.
Figure 3:
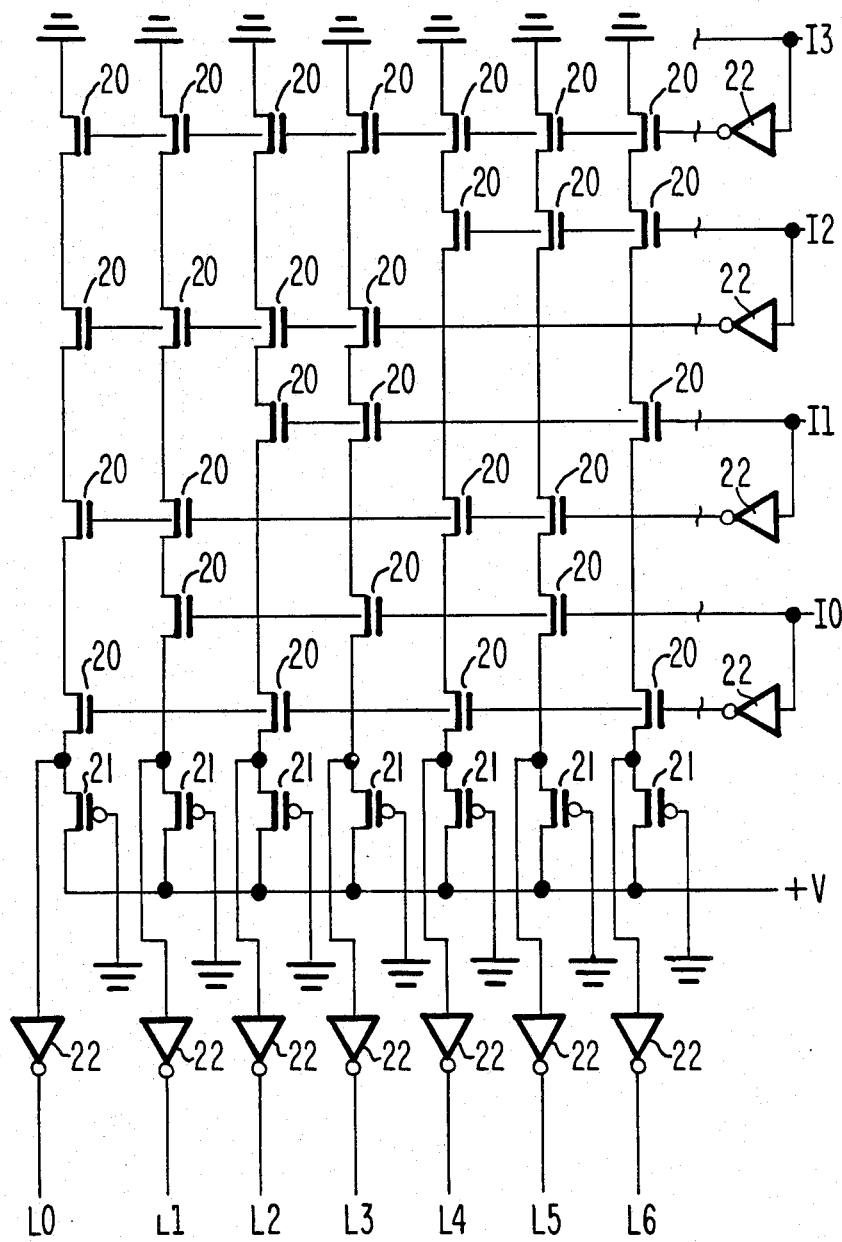
FIG. 3 is a detailed circuit diagram of a portion of two decoders D1 and D2 in the FIG. 1 signal generator.

Referring now to FIG. 1, a preferred embodiment of a signal generator that is constructed according to the invention will be described. This embodiment includes sixteen conductors which are labeled as C0, C1, C2, ..., C15. Each conductor is coupled through a respective resistive means R to a voltage bus B1 that carries a voltage +V1. Suitably, each resistive means R consists of a P-channel MOS transistor having a grounded gate.

A first set of N-channel transistors, which is arranged in transistor groups G1 through G15, couples conductors C1 through C15 to a second voltage bus. Group G1 includes fifteen transistors which couple conductors C1–C15 to a voltage bus B2 that carries a ground potential; group G2 includes fourteen transistors which couple conductors C2–C15 to voltage bus B2; group G3 includes thirteen transistors which couple conductor C4–C15 to voltage bus B2; ..., etc.

A second set of N-channel transistors, which is arranged in transistor groups G1′ through G15′, couples conductors C0 through C14 to voltage bus B2. Group G1′ includes one transistor which couples conductor C0 to voltage bus B2; group G2′ includes two transistors which couple conductors C0–C1 to voltage bus B2; group G3′ includes three transistors which couple conductors C0–C2 to voltage bus B2; ..., etc.

Also included in the FIG. 1 embodiment are a pair of decoders D1 and D2. Decoder D1 has multiple output lines L0, L1, ... L14 which respectively couple to the gates of the transistors in groups G1, G2, ... G15. By comparison, decoder D2 has multiple output lines L1, L2, ... L15 which respectively couple to the gates of the transistors in groups G1′, G2′, ... G15′. Details of these couplings are shown in FIG. 1A.

Decoder D1 and decoder D2 have input terminals I for receiving respective binary codes. In response to the received code, each decoder generates a signal on its output line which has the same number as the code. That signal then turns on the group of transistors to which it is coupled. For example, when decoder D1 receives a code of 0, it generates a signal on its output line L0 which turns on all of the transistors of group 1. Similarly, when decoder D2 receives a code of 8, it generates a signal on its output line L8 which turns on all of the transistors of group G8'.

Codes are supplied to the input terminals I of decoders D1 and D2 by a pair of multiplexers M1 and M2, a subtracter circuit S1, an adder circuit A1, and a comparator circuit CMP. Circuit A1 adds 1 to an externally generated code CD#1, while circuit S1 substracts 1 from another externally generated code CD#2. Multiplexer M1 has a pair of input terminals which respectively receive code CD#1 and code CD#2 minus 1. Similarly, multiplexer M2 has a pair of input terminals which respectively receive code CD#2 and code CD#1 plus 1.

Comparator CMP compares the codes CD#1 and CD#2, and in response it generates a SELECT signal for multiplexers M1 and M2. If code CD#1 is greater than or equal to code CD#2, then SELECT is true and CD#1 and CD#2 respectively pass through multiplexers M1 and M2 to decoders D1 and D2. Conversely, if code CD#1 is less than code CD#2, then SELECT is false and CD#2 minus 1 passes through multiplexer M1 to decoder D1 while code CD#1 plus 1 passes through multiplexer M2 to decoder D2.

An inverting multiplexer M3 is also included in the FIG. 1 circuit. Multiplexer M3 has a plurality of input terminals which respectively couple to conductors C0 through C15. Multiplexer M3 also has a control input terminal which is coupled to receive the SELECT signal. If SELECT is true, then the signals on conductors C0–C15 pass directly through multiplexer M3 as signals S0–S15. Conversely, if SELECT is false, then the signals on conductors C0–C15 are inverted by multiplexer M3 and generated on the output terminals as signals S0–S15.

FIG. 2 shows how codes CD#1 and CD#2 are operated on by the FIG. 1 generator to produce the output signals. In the example of column 1 FIG. 2, code CD#1 is a binary 10 and code CD#2 is a binary 3. Comparator CMP compares these codes; and in response it forces SELECT true since code CD#1 is greater than code CD#2.

Multiplexer M1 receives the SELECT signal, and in response it passes code CD#1 to the input terminals I of decoder D1. Then decoder D1 responds to the binary 10 on its input terminals by generating a signal on its output line L10 which turns on all of the transistors in group G11. Those turned-on transistors then couple conductors C11–C15 to ground on bus B2.

Multiplexer M2 also receives the SELECT signal; and in response to its true state, multiplexer B passes code CD#2 to the input terminals I of decoder D2. Code CD#2 is a binary 3, and so decoder D2 generates a signal on its output line L3 which turns on all of the transistors in group G3'. Those turned-on transistors then couple conductors C0–C2 to ground on bus B2.

In the above example, the transistors which couple to conductors C10–C3 remain turned off. Thus, the +V1 voltage on bus B1 passes through the resistors R to those conductors. All of the +V1 signals on conductors C10–C3 are then sent to multiplexer M3; and in response to the true state of the SELECT signal, they are regenerated by multiplexer M3 as output signals S10–S3.

Column 2 of FIG. 2 illustrates another example of the operation of the FIG. 1 generator in which code CD#1 is greater than code CD#2. In this example, code CD#1 is a binary 12 and code CD#2 is a binary 8. Since CD#1 is greater than CD#2, the SELECT signal is true and so codes CD#1 and CD#2 respectively pass to decoders D1 and D2.

Decoder 12 responds to the binary 12 by generating a signal on its output line L12 which turns on the transistors of group G13; and those turned-on transistors couple conductors C15–C13 to ground. Decoder D2 responds to the binary 8 by generating a signal on its output line L8 which turns on the transistors of group G8'; and those turned-on transistors couple conductors C7–C0 to ground.

In this example, all of the transistors that couple to conductors C12–C8 remain turned off. Signals on those conductors therefore remain at voltage +V1; and they are passed through multiplexer M3 in response to the true state of the SELECT signal as output signals S12–S8.

In the example of column 3, code CD#1 and code CD#2 both equal a binary 6. This causes the signal generator to only generate output signal S6. Since code CD#1 and CD#2 are equal to each other, comparator CMP forces the SELECT signal true. Thus, decoders D1 and D2 respectively receive codes CD#1 and CD#2.

In response to the binary 6 of code CD#1, decoder D1 generates a signal on its output line L6 which tuns on the transistors of group G7. Likewise, in response to the binary 6 on its input terminals, decoder D2 generates a signal on its output line L6 which turns on the transistors of group G6'. These turned-on transistors couple conductors C15–C7 and C5–C0 to ground while conductor C6 remains at voltage +V1. That +V1 voltage on conductor C6 then passes through multiplexer M3 as signal S6 in response to the true state of the SELECT signal.

In the example of column 4, code CD#1 is a binary 3 and code CD#2 is a binary 12. Since code CD#2 is greater than code CD#1, circuit CMP forces the SELECT signal false. Thus, multiplexer M1 passes code CD#2 minus 1 (which is a binary 11) to the input terminals of decoder D1. In response to that binary 11, decoder D1 generates a signal on its output line L11 which turns on all the transistors of group G12. Those turned-on transistors then couple conductors C15–C12 to ground.

Also, in response to the false state of the SELECT signal, multiplexer M2 couples code CD#1 plus 1 (which is a binary 4) to decoder D2. In response to that binary 4, decoder D2 generates a signal on its output line L4 which turns on all of the transistors of group G4'. Those turned-on transistors couple conductors C3–C0 to ground.

All of the ground signals on conductors C15–C12 and C3–C0 are sent to multiplexer M3 whereupon they are inverted in response to the false state of the SELECT signal. This inversion in multiplexer M3 produces output signals S3–S0 and S15–S12.

Another example in which code CD#1 is less than code CD#2 is given in column 5. There, code CD#1 is a binary 4 and code CD#2 is a binary 10. In response to these codes, a binary 9 is sent to decoder D1; a binary 5 is sent to decoder D2; transistors of group G10 and G5' are turned on to force conductors C15–C10 and C4–C0 to ground; and the signals on the grounded conductors are inverted by multiplexer M3 to produce output signals S4–S0 to S15–S10.

Referring now to FIGS. 3-8, detailed circuits for the various modules of the FIG. 1 generator will be described. Beginning with FIG. 3, it shows a circuit for decoders D1 and D2 which includes enhancement mode transistors 20, depletion mode transistors 21, and inverters 22. In operation, input signals are received at the left-hand side of the circuit whereupon they are inverted and selectively sent to the transistors 20. All of the transistors 20 of the leftmost column turn on when the input signals are binary 0; all of the transistors 20 of the next column turn on when the input signals are a binary 1; etc. When all of the transistors of a particular column turn on, ground is sent through those turned-on transistors to an inverter 22 which responds by generating a signal on an output line.

FIG. 4 shows a circuit for the adder module A1. This circuit includes EXCLUSIVE-OR gates 30, inverters 31, and an AND gate 32 all of which are interconnected as illustrated. In operation, code CD#1 is received on the right-hand side of the circuit whereupon bit 0 is inverted. Bit 1 is inverted only if bit 0 is a 1; bit 2 is inverted only if bit 0 and bit 1 are both 1; etc. In effect, this adds a binary 1 to code CD#1.

FIG. 5 shows the details of the subtracter circuit S1. This circuit includes EXCLUSIVE-OR gates 40, inverters 41, and NOR gates 42. In operation, the least significant bit is inverted. Bit 1 is inverted if bit 0 is a 0; bit 2 is inverted if both bit 0 and bit 1 is a 0; etc. In effect, this subtracts a binary 1 from code CD#2.

FIG. 6 shows the details of a circuit for multiplexer M1 and multiplexer M2. This circuit includes a set of transistors 50, another set of transistors 51, an inverter 52, and buffers 53. In operation, the SELECT signal is sent to the transistors 50 and the inverse of the SELECT signal is sent to transistors 51. If SELECT is true, transistors 50 turn on to pass the signals that are on their source (i.e., CD#1) through buffer 53 to the output terminals. Conversely, if SELECT is false, transistors 51 turn on to pass signals on their source (i.e., CD#2 minus 1) through buffer 53 to the output terminals.

Figure 7:
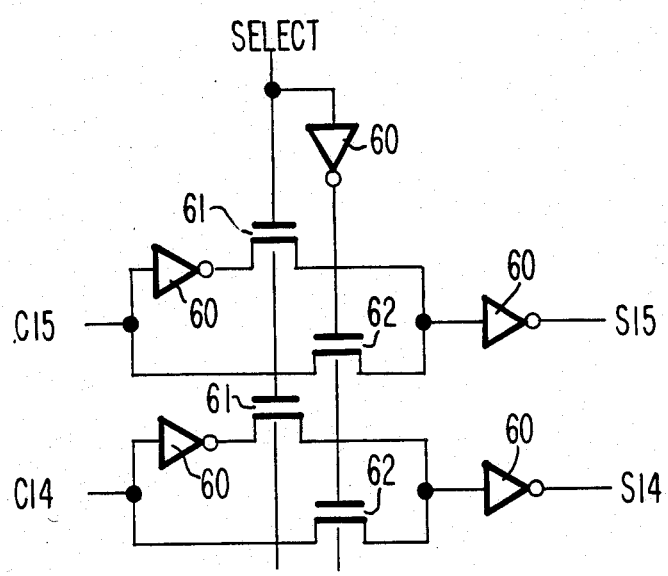
FIG. 7 is a detailed logic diagram of a portion of a multiplexer M3 in the FIG. 1 signal generator.

FIG. 7 shows a detailed circuit diagram of the inverting multiplexer M3. It includes inverters 60, a set of transistors 61, and another set of transistors 62, all of which are interconnected as illustrated. If the SELECT signal is true, transistors 61 turn on to thereby pass the signals on the conductors C15-C0 with a double inversion (i.e., with a net of no inversion) as the output signals S15-S0. Conversely, if the SELECT signal is false, transistors 62 turn on to thereby pass the signals on conductors C15-C0 with a single inversion as the output signals S15-S0.

Figure 8:
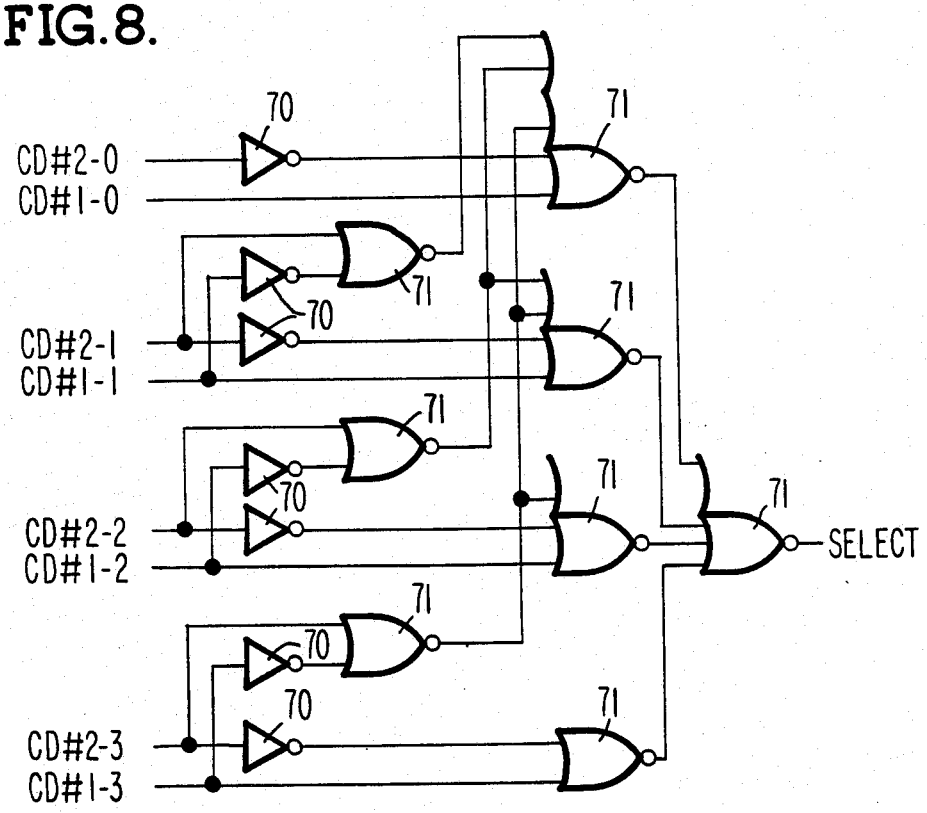
FIG. 8 is a detailed logic diagram of a comparator CMP in the FIG. 1 signal generator.

FIG. 8 shows a detailed logic diagram of comparator module CMP. It includes inverters 70 and NOR gate 71, all of which are interconnected as illustrated in the figure. Codes CD#1 and CD#2 are received by the FIG. 7 comparator at its left-hand side. If code CD#1 is equal to or greater than code CD#2, then the logic gates 70 and 71 operate to generate a true SELECT signal; whereas if code CD#2 is less than code CD#1, then logic gates 70 and 71 operate to generate a false SELECT signal.

A preferred embodiment of the invention has now been described in detail. In addition, however, many changes and modifications can be made to this embodiment without departing from the nature and spirit of the invention.

For example, while the FIG. 1 embodiment includes only sixteen conductors C0-C15, that number may readily be expanded to any larger number N. Each of the N conductors would couple through respective resistive means R to voltage bus B1. Decoder D1 would have N output lines L0, L1, ... LN−1 on which active signals are respectively generated in response to binary input codes of 0, 1, 2, ... N−1. Transistor group G1 would couple conductors C1 thru CN to voltage bus B2 in response to the active signal on output line L1 of decoder D1; transistor group G2 would couple conductors C2 thru CN to voltage bus B2 in response to an active signal on output line L1 of decoder D1; etc. Decoder D2 would have N output lines L1, L2, ... LN on which active signals are respectively generated in response to binary input codes of 1, 2, ... N. Transistor group G1' would couple conductor C0 to voltage bus B2 in response to the active signal on output line L1 of decoder D2; transistor group G2' would couple conductors C1 thru C0 to voltage bus B2 in response to an active signal on output line L2 of decoder D2; etc. Modules M1, M2, S1, A1, and CMP would be symmetrical to the circuits of FIGS. 3-8 but would be expanded to handle additional bits for codes CD#1 and CD#2. Multiplexer M3 would also be expanded to handle the additional conductors.

Consider now the number of transistors that would be coupled to the conductors of the FIG. 1 generator for the case where 64 output signals S0 thru S63 are to be generated. In that case, there would be 64 conductors C0 thru C63. Each group of conductors (e.g., G1) and its complementary group (e.g., G1') together would consist of 64 transistors; and the total number of such group pairs would be 63. Thus, the total number of transistors would equal $64 \times 63$ or 4022. This is a substantially smaller number than the 262,144 transistors that are required to implement a 64-bit mask signal generator with a read only memory.

As another modification, each resistor means R of FIG. 1 may be comprised of a depletion N-channel transistor having its gate connected to its source. As another variation, bipolar transistors may be used in FIG. 1A. Utilizing an NPN transistor, the transistor's collector would connect to conductor C0; the transistor's base would connect to output line L12; and the transistor's emitter would connect to voltage bus B2.

Accordingly, it is to be understood that the invention is not limited to said details but is defined by the appended claims.

What is claimed is:

1. A signal generator comprised of:
    a plurality of conductors numbered 0 thru N respectively for carrying output signals thereon;
    each of said conductors being coupled through a respective resistive means to a first voltage bus;
    first, second, third, ..., N groups of transistors of a first set which respectively couple said conductors 1 thru N, 2 thru N, 3 thru N, ..., N to a second voltage bus;
    first, second, third, ..., N groups of transistors of a second set which respectively couple said conductors 0, 0 thru 1, 0 thru 2, ..., 0 thru N−1 to said second voltage bus; and
    means for receiving input signals, and in response thereto, for turning on said transistors of a selectable group of said first set and a selectable group of said second set to thereby generate said output signals on said conductors.

2. A signal generator according to claim 1 wherein said means for turning on said transistors includes:
first and second decoder means, each of which has N output lines;
each output line of said first decoder means being respectively coupled to one group of transistors of said first set; and each output line of said second decoder means being respectively coupled to one group of transistors of said second set;
each of said decoder means being operative in response to said input signals for generating a control signal on one of its output lines as selected by said input signals that turns on the group of said transistors to which said one output line is coupled.

3. A signal generator according to claim 2 which further includes:
means for receiving first and second codes as said input signals and for comparing them to each other;
means for sending said first and second codes respectively to said first and second decoder means if said first code equals or exceeds said second code;
means for adding one to said first code and sending the result to said second decoder means, and for subtracting one from said second code and sending the result to said first decoder means if said first code is less than said second code; and
means for inverting the voltages on said plurality of conductors if said first code is less than said second code.

4. A signal generator according to claim 2 wherein said transistors are field effect transistors.

5. A signal generator according to claim 2 wherein said transistors are bipolar transistors.

6. A signal generator comprising:
multiple conductors numbered 0 thru N respectively;
means for coupling a first voltage through respective resistive means to all of said conductors;
a means for receiving input signals to said generator;
a first switching means, coupled to said means for receiving and to said conductors, for switching a second voltage selectively onto any one group of said conductors 1 thru N, 2 thru N, 3 thru N, ..., N in response to said input signals;
a second switching means, coupled to said means for receiving and to said conductors, for switching said second voltage selectively onto any one group of said conductors 0, 0 thru 1, 0 thru 2, ..., 0 thru N−1 in response to said input signals;
said first and second voltages on said conductor 0 thru N forming output signals for said generator.

7. A signal generator according to claim 6 wherein said first switching means includes first, second, third, ..., N groups of transistors which respond to said input signals to respectively couple said conductors 1 thru N, 2 thru N, 3 thru N, ..., N, to said second voltage, and said second switching means includes first, second, third, ..., N groups of transistors which respond to said input signals to respectively couple said conductos 0, 0 thru 1, 0 thru 2, ..., 0 thru N−1 to said second voltage.

8. A signal generator according to claim 7 wherein said means for receiving includes a means responsive to said input signals for turning on a selectable group of said transistors in said first switching means and for turning on a selectable group of said transistors in said second switching means.

9. A signal generator according to claim 8 wherein said means for turning on said transistors includes:
a means for comparing, adding, and subtracting first and second codes within said input signals;
a means for turning on a group of transistors in said first switching means as selected by said first code and turning on a group of transistors in said second switching means as selected by said second code if said first code equals or exceeds said second code; and
a means for turning on a group of transistors in said first switching means as selected by said second code minus one and turning on a group of transistors in said second switching means as selected by said first code plus one if said first code is less than said second code.

10. A signal generator comprised of:
a plurality of conductors numbered 0 thru N respectively for carrying output signals thereon;
each of said conductors being coupled through a respective resistive means to a first voltage bus;
each of said conductors being coupled through a respective plurality of N transistors in parallel to a second voltage bus; and
means for receiving input signals and in response thereto for generating said output signals by selectively turning on said transistors in first and second groups; wherein no two transistors of any group couple to the same conductor, and the conductors to which the transistors of said first group couple are 1 thru N, 2 thru N, ..., N, and the conductors to which the transistors of said second group couple are 0 thru N−1, 0 thru N−2, ..., 0.

* * * * *